United States Patent [19]
Ito et al.

[11] Patent Number: 5,742,524
[45] Date of Patent: Apr. 21, 1998

[54] DISTANCE MEASURING DEVICE

[75] Inventors: Akira Ito; Hiroyuki Saito; Teruyo Miyata, all of Yotsukaido, Japan

[73] Assignee: Seiko Precision Inc., Japan

[21] Appl. No.: 653,431

[22] Filed: May 24, 1996

[30] Foreign Application Priority Data

May 26, 1995 [JP] Japan ................. 7-128292

[51] Int. Cl.⁶ ........................... G03B 13/36
[52] U.S. Cl. .................. 364/561; 396/99; 396/120; 396/106; 396/104; 250/201.4; 250/201.6
[58] Field of Search ................... 304/561; 396/89, 396/94, 106, 138, 104; 250/201.1, 201.4, 201.6

[56] References Cited

U.S. PATENT DOCUMENTS

| | | | |
|---|---|---|---|
| 5,128,529 | 7/1992 | Nagaoka et al. | 250/201.6 |
| 5,204,714 | 4/1993 | Nonaka et al. | 354/403 |
| 5,444,511 | 8/1995 | Seki et al. | 354/403 |
| 5,572,012 | 11/1996 | Saito et al. | 250/201.6 |

FOREIGN PATENT DOCUMENTS

| | | |
|---|---|---|
| 2272592 | 5/1994 | United Kingdom . |
| 2279197 | 12/1994 | United Kingdom . |
| 2287599 | 9/1995 | United Kingdom . |

*Primary Examiner*—Emanuel T. Voeltz
*Assistant Examiner*—Hien Vo
*Attorney, Agent, or Firm*—Adams & Wilks

[57] ABSTRACT

In order to improve the accuracy and reliability of a distance measurement device of the light-projecting type, the device is provided with a reference voltage generator for generating a reference voltage having a level dependent upon whether or not a light is being projected. The distance measurement device includes a light projecting circuit for projecting pulsed light onto an object, a light receiving circuit for receiving the light projected by the light projecting circuit and reflected by the object, current-to-voltage conversion circuitry for converting a current output by the light receiving circuit into a corresponding voltage, amplifier circuitry for amplifying the output signals of the current-to-voltage conversion circuits, an integration circuit for integrating the output signal of the amplifier circuit, a level judgement circuit for judging the level of the output signal of the integration circuit by comparing it with a reference voltage, and an arithmetic circuit for switching the reference voltage depending on whether the light-projecting circuit is projecting light and for calculating the distance of the object based on the output of the level judgement circuit.

25 Claims, 10 Drawing Sheets

| X | D (m) |
|------|-------|
| 0.50 | ∞ |
| 0.55 | 3.70 |
| 0.60 | 1.85 |
| 1.00 | 0.37 |

DISTANCE MEASURING DEVICE

BACKGROUND OF THE INVENTION

1. Field of the Invention

The present invention relates to a distance measuring device for a camera or the like.

2. Description of the Related Art

Various distance measuring devices of a light projecting and receiving type utilizing an integration circuit have been proposed. Such devices the distance of an object by operating a light-projecting circuit a predetermined number of times (or period) and by performing A-D conversion on the resultant integrated voltage. Such a distance measuring device must have a plurality of comparators to convert a voltage across of terminals of an integration capacitor into a digital signal (for example, see Japanese patent publication Laid-open (KOKAI) No. H3-119307). Further, the resolution of such a distance measuring device is proportionate to the number of the comparators. Therefore, efforts toward improved distance measuring accuracy have resulted in increased complexity, scale and cost of a circuit.

Under such circumstances, methods have come into use to improve resolution in which the distance of an object is calculated from the numbers of operations of projecting light of each output of long and short distance sides of light receiving means without converting a voltage across an integration capacitor into a digital signal (for example, see Japanese patent publication Laid-open (KOKAI) No. H6-194567).

In a circuit having the above-described configuration, the integrated voltage is always compared with a predetermined reference voltage. There is an approach for preventing the malfunction of such a circuit by stopping a voltage raising circuit in a power supply of a control circuit which can often produce noises in the circuit during a light emitting period of a light-projecting portion and during integration. During a non-light-emitting period, however, noises from this voltage rasing portion and the like have sometimes resulted in problems such as an error in a result of comparison operation which has occurred even in the absence of an integrating operation.

It is therefore an object of the invention to provide a distance measuring device for a camera or the like which is not adversely affected by circuit noises and is capable of distance measuring with high accuracy.

SUMMARY OF THE INVENTION

In order to solve the above-described problems, according to the present invention, there is provided a distance measurement devices, comparising light projecting means for projecting pulsed light onto an object, a light-receiving means for receiving the light projected by said light-projecting means and reflected by the object, a current-to-voltage conversion circuit for converting a current output by said light-receiving means into a voltage, an amplifier circuit for amplifying the output signal of said current-to-voltage conversion circuit, an integration circuit for integrating the output signal of said amplifier circuit, a level judgement circuit for judging the level of the output signal of the integration circuit by comparing it with a reference voltage, control means for switching the reference voltage depending on whether said light-projecting means is projecting light or not, and a calculating circuit for calculating the distance of said object based on the output of said level judgement circuit.

When the light-projecting portion is not emitting light, the reference voltage of a comparator with which a signal to be measured is compared is increased by a predetermined value. This eliminates the influence of noises.

DETAILED DESCRIPTION OF THE PREFERRED EMBODIMENT

Figure 1:
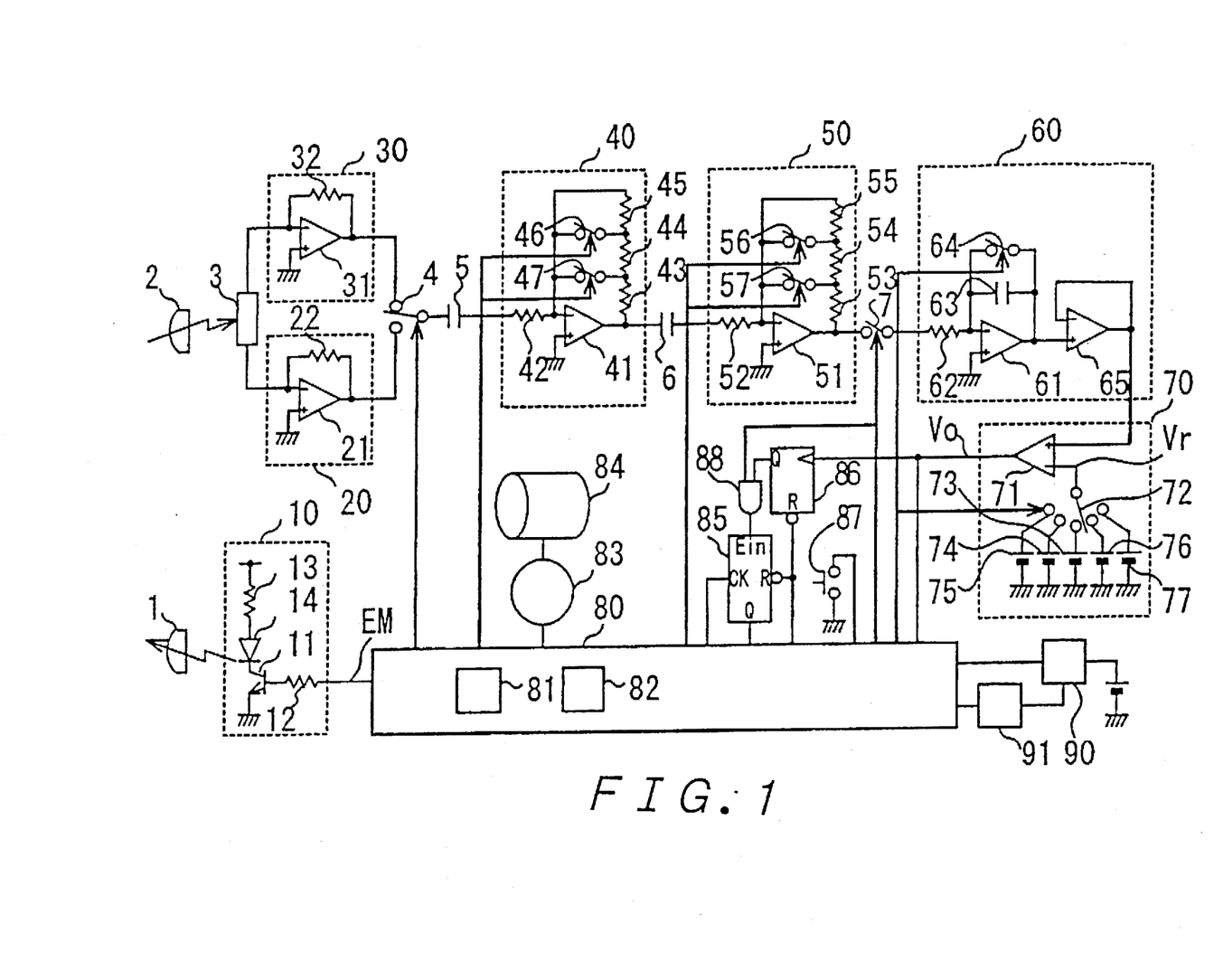
FIG. 1 is a configuration diagram showing an embodiment of the present invention.

One embodiment of the present invention will now be described with reference to FIG. 1. In FIG. 1, a CPU 80 performs calculations and controls over other circuits based on programs and data stored in a ROM 82 to be described later. The CPU 80 includes a random access memory (hereinafter referred to as "RAM") 81 used for calculations and temporary storage and particularly for storing count values N1 and N2 or an "infinity" flag Fi and a "close" flag Fc to be described later and a read only memory (hereinafter referred to as "ROM") 82 for storing programs and data. Externally attached to the CPU 80 are a timer 85 for generating timing signals, a T-type flip-flop 86 for starting and stopping the operation of the timer 85, and a release switch 87 for allowing a user to photograph. The timer 85 has a data length of 14 bits and is started, stopped, set, and cleared under the control of the CPU 80. When the CPU 80 generates a start signal, the timer 85 continues to increment its value by 1 every 0.625 microseconds until a stop signal is output. Since the data length is 14 bits, the total measurable time is about 10 milliseconds.

A light-projecting circuit 10 is a driving circuit for driving an IRED 1 and consists of a transistor 11, a base resistor 12, a collector resistor 13, and the IRED 14. When the CPU 8 0 generates a light projection signal, the IRED 14 emits light. The emitted light passes through a light-projecting lens 1 and is partially reflected by an object to be photographed which is not shown. A part of the reflected light passes through a light-receiving lens 2 and is received by a PSD 3. In practice, the IRED 14 is driven by a pulse.

A first current-to-voltage conversion circuit 20 and a second current-to-voltage conversion circuit 30, in combination with the PSD 3, form a light-receiving circuit. When an optical signal is received by the PSD 3, it generates a current pair which is in accordance with the strength and the receiving position of the receive light and output a signal to each of the first current-to-voltage conversion circuit 20 and the second current-to-voltage conversion circuit 30. The first current-to-voltage conversion circuit 20 is a circuit for generating a voltage proportionate to a current input thereto and is formed by an amplifier 21 and a feedback resistor 22. The second current-to-voltage conversion circuit 30 has an amplifier 31 and a feedback resistor 32 and has a configuration similar to that of the first current-to-voltage conversion circuit 20 and each outputs a voltage corresponding to a signal current is to a switch 4.

The switch 4 has a function of transferring the output of either the first current-to-voltage conversion circuit 20 or second current-to-voltage conversion circuit 30 to circuits downstream thereof, and the state of this switch is controlled by the CPU 80. It contacts with the first current-to-voltage conversion circuit 20 when a measurement in a longer distance range is to be performed and contacts with the second current-to-voltage conversion circuit 3 0 when measurement in a shorter distance range is to be performed.

An amplifier circuit 40 and an amplifier circuit 50 are amplifier circuits having a switchable gain. Since these are similar circuits, only the amplifier circuit 40 will be described in detail. A coupling capacitor 5 is connected upstream of the amplifier circuit 40 to eliminate DC components in a signal input thereto. The amplifier circuit 40 is a circuit for amplifying an input signal with a predetermined gain and is formed by an amplifier 41 and three feedback resistors 43, 44 and 45. This circuit includes two switches, i.e., switches 46 and 47 which can be turned on and off under the control of the CPU 80.

The switch 46 connects the feedback resistor 45 to the feedback path and the switch 47 connects the feed back resistors 44 and 45 to the feed back path respectively. As a result, the gain of the amplifier 41 varies stepwise depending on the state of those switches. A signal current is converted into a voltage in accordance with the varied gain and is output to subsequent circuits.

The amplifier circuit 50 has a similar configuration wherein switches 56 and 57 are set to have appropriate gains under the control of the CPU 80 and the signal output by the amplifier 40 is amplified accordingly. The output signal of the amplifier circuit 50 is output to an integration circuit 60 downstream thereof through a switch 7.

The integration circuit 60 is a circuit for performing time integration on an input voltage which is formed by an amplifier 61, an input resistor 62, an integration capacitor 63, a switch 64, and a voltage follower 65. The switch 64 discharges residual charge in the integration capacitor 63 under the control of the CPU 80. The value of time integral of an input signal is accumulated as charge in the integration capacitor 63 while the switch 7 is on. The charged voltage of the integration capacitor 63 is output to a level judgement circuit 7 0 through the voltage follower 65.

The level determination circuit 70 is formed by a comparator 71, a switch 72, a reference power supply 73 for generating a voltage V0, a reference power supply 74 for generating a voltage V1L, a reference power supply 75 for generating a voltage V1H, a reference power supply 76 for generating a voltage V2L, and a reference power supply 77 for generating a voltage V2H. The comparator 71 compares the output of the integration circuit 60 with any one of the voltages V0–V2H output by the reference power supplies 73–77 which is selected by the switch 72 and output the comparison result to the CPU 80.

A voltage rasing circuit 90 is a chopper-type voltage raising circuit which starts or stops a voltage raising operation according to a clock signal transmitted by the CPU 80. The CPU 80 responds to the output of a voltage detection circuit 91 and causes a voltage rasing operation by transmitting the clock signal to the voltage rasing circuit 90 when the raised voltage is low, and stops the transmission of the clock signal when a proper voltage is reached. However, the voltage rasing operation is unconditionally stopped during the operation of the light-projecting circuit 10 because the accuracy of distance measuring can be adversely affected by noises during this period as described later. An operation period of the light-projecting circuit 10 is normally approximately 20 microseconds, and it takes a few seconds interval time for the light-projecting circuit 10 to start the next operation from the end of a current operation. The raised voltage is normally recovered during this interval. Therefore, a decrease in the raised voltage resulting from the operation of the light-projecting circuit 10 does not adversely affect the operation of the CPU 80.

The operation of the circuit of the present embodiment will now be described. At the beginning of the distance measuring routine, the power supplies of all the circuits shown in FIG. 1 are turned on. Next, the CPU 80 dears the contents of the RAM 81 and determines the gains of the amplifier circuits 40 and 50. If it is determined during this gain determining operation that the object is in a position closer than a certain distance, a "close" flag Fc in the RAM 81 is set. In this case, distance measurement is not performed and it is determined that the object is too close. Otherwise, distance measurement is performed using the first current-to-voltage conversion circuit 20, and a count value N1 is stored in the RAM 81. If it is determined during this distance measuring operation for a long distance side of light receiving circuit that the object is in a position at a maximum measurable distance or farther, an "infinity" flag Fi in the RAM 81 is set. In this case, it is determined that the object is at infinity. Otherwise, distance measuring is performed using the second current-to-voltage conversion circuit 30 thereafter, and a count value N2 is stored in the RAM 81. When the above-described distance measuring operation is terminated, a value X as shown below is calculated on an assumption that the object is at infinity if the "infinity" flag Fi is set and the object is at a close distance if the "close" flag Fc is set. If neither of these flags is set, the value X is calculated using count values N1 and N2 stored in RAM 81.

$$X = N1/(N1+N2)$$

Figure 6:
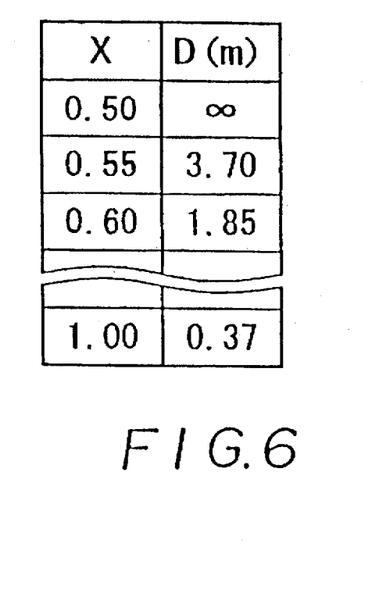
FIG. 6 shows a table in a ROM 82 for obtaining a distance from a value X of the embodiment of the present invention.
Figure 7:
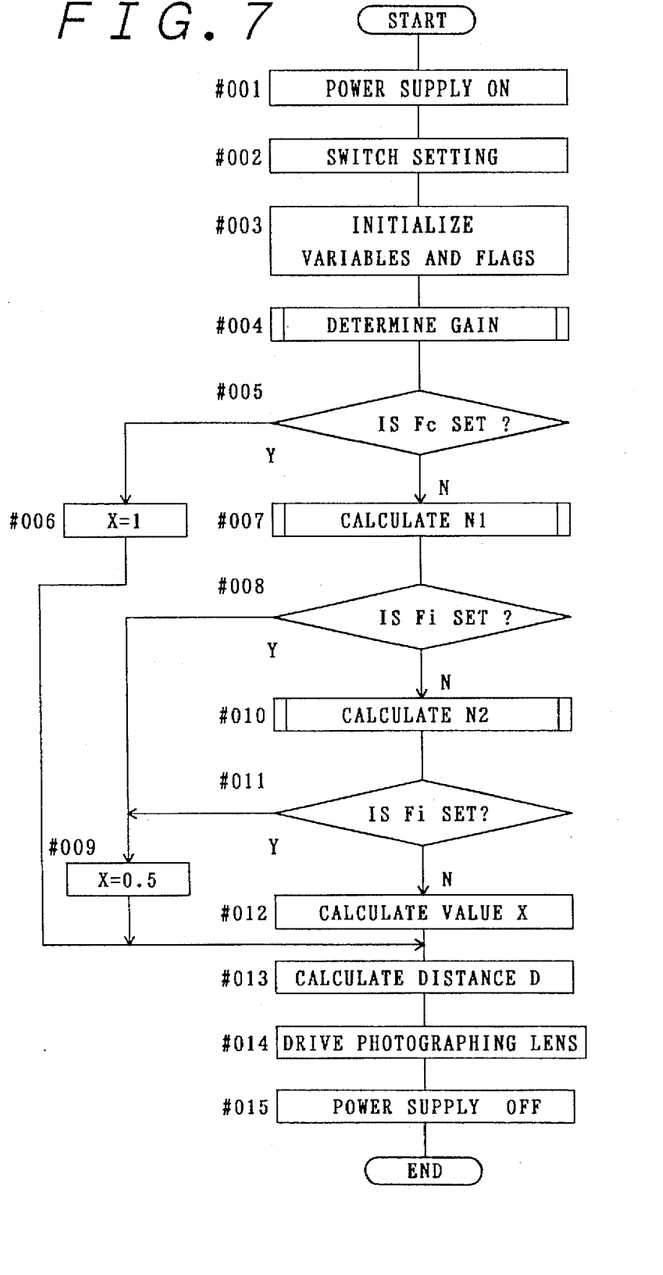
FIG. 7 is a flow chart showing the operation of the embodiment of the present invention.

The distance D of the object is found by referring to the predetermined address in the ROM 82 defined by this value X. This is the same as determining the distance D from the value X shown in FIG. 6. When the distance D is determined, the CPU 80 causes a motor 83 to operate to drive a photographing lens 84 to a focusing position and finally turns off the power supply of the distance measuring circuit, and this terminates this routine.

The gain determining operation of the amplifier circuits 40 and 50 will now be described with reference to FIG. 2. First, the CPU 80 places the switch 4 in the position to contact with the first current-to-voltage conversion circuit 20, places the switch 72 in the position to contact with reference power supply T3 to supply the voltage V0 to an inverting input terminal of the comparator 71, and clears a count value Ns to 0. Next, the CPU 80 turns on (i.e., closes) the switch 64 to discharge the residual charge in the integration capacitor 63. After discharging the capacitor 63, the CPU 80 turns off (i.e., opens) the switch 64 and generates a counter reset signal CR to clear a count value Ne to 0 (t=b in FIG. 2). Then, the CPU 80 causes the light-projecting circuit 10 to operate to start projecting pulsed light onto the object (t=c in FIG. 2). In order to reserve the rise time of each amplifier at the beginning of light projection and to reduce the influence of the fluctuation of the power supply, the integration circuit 6 0 is operated for time T2 after time T1 T=has elapsed since the start of light projection (d in FIG. 2). After the time T2, the CPU 80 stops the projection of light and integration and stands by for time T3 (t=e in FIG. 2) during which a count-up signal CU is generated to increment the count value Ne by 1 (t=f in FIG. 2 ).

Figure 2:
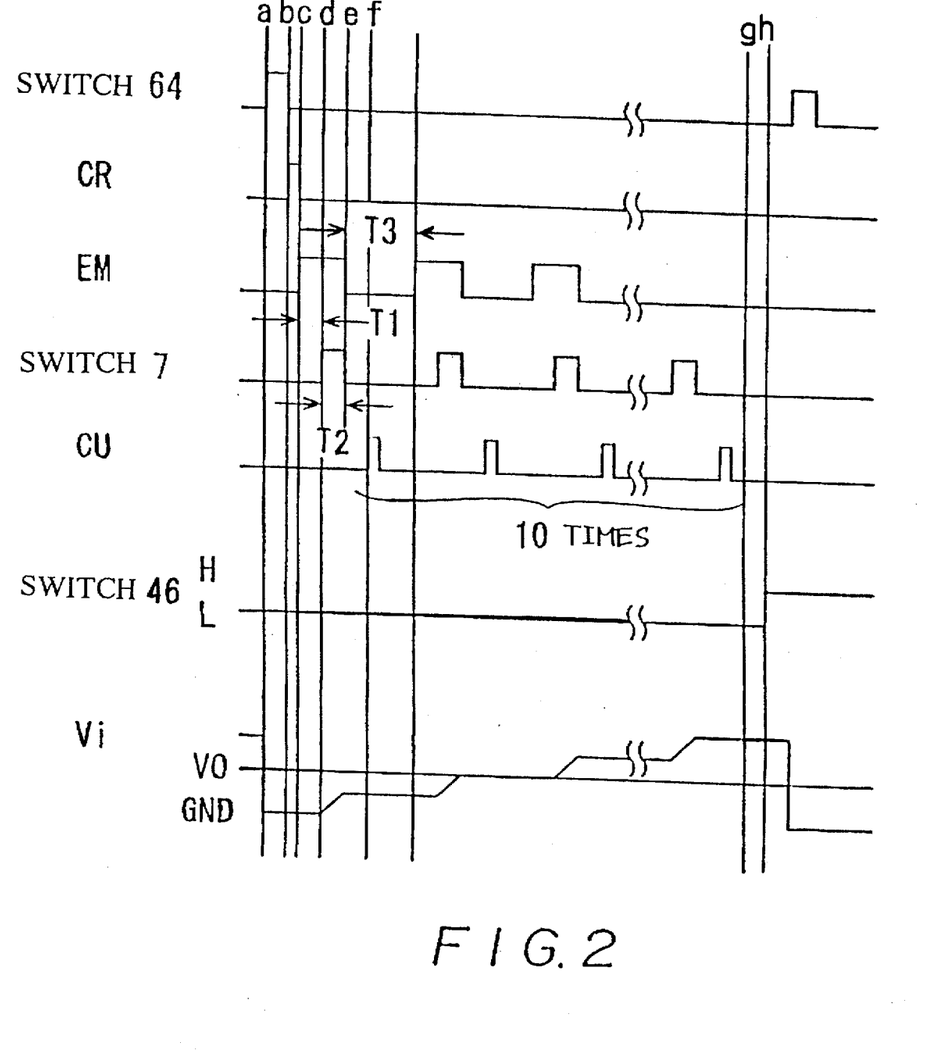
FIG. 2 is an operational diagram illustrating an integrating operation of the embodiment of the present invention.
Figure 3:
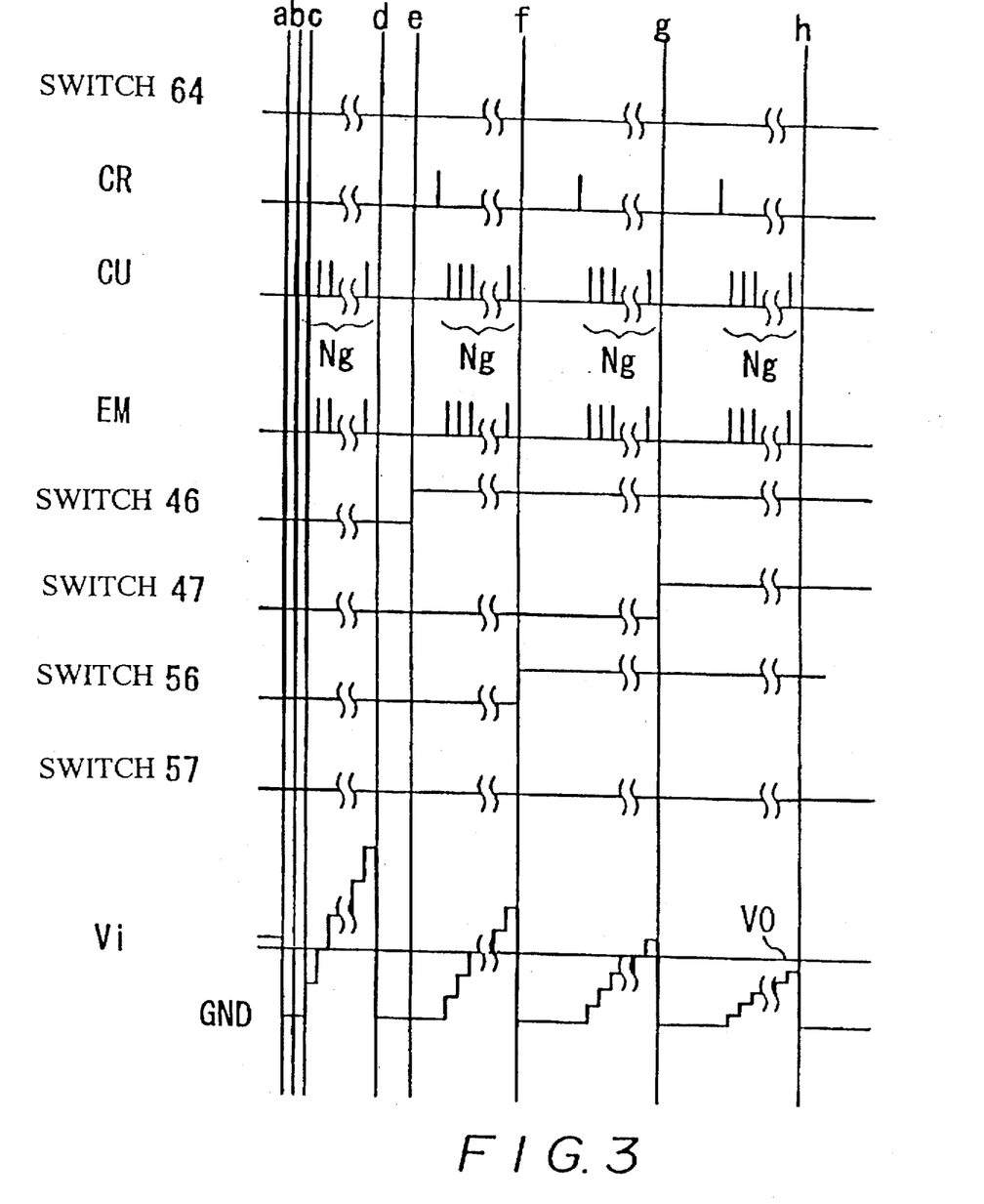
FIG. 3 is an operational diagram illustrating a method for determining the gains of amplifier circuits 40 and 50 of the embodiment of the present invention.

After the above-described operation is repeated ten times, the switch 7 is turned off; a voltage of the integration capacitor 63, i.e., an integrated voltage Vi is compared with the voltage V0 (t=g in FIG. 2); and, if the integrated voltage Vi is higher than the voltage V0, the switch 46 is turned on (t=h in FIG. 2). This reduces the gain by one step, and the CPU 80 stores the magnitude of the gain by incrementing the count value Ns. Thereafter, the integrating operation and comparison operation are repeated similarly and, if the integrated voltage Vi is still higher than the voltage V0, the switches 56, 47, and 57 are sequentially (i.e., closed) turned on in the order listed. This reduces the gain and increments the count value Ns sequentially. If the integrated voltage Vi is still higher than the voltage V0 even after all the switches are turned on, the "close" flag Fc is set. The above-described operation determines the gain of the amplifier circuit as a whole. FIG. 3 shows a case wherein the integrated voltage Vi is lower than voltage V0 when the switch 57 is turned on.

Distance measuring using the first current-to-voltage conversion circuit 20 will now be described in detail with reference to FIG. 4. First, the switch 4 is placed in the position to turn on the first current-to-voltage conversion circuit 20 . Next, the switch 64 is turned on to discharge the charge accumulated in the integration capacitor 63 and, thereafter, the switch 64 is turned off (t=a in FIG. 4 ). Then, a count value Nm is cleared to 0 (t=b in FIG. 4). The reference voltage is set at the voltage V1L generated by the reference power supply 74 when light is projected, and the reference voltage is set at the voltage V1 H generated by the reference power supply 75 when no light is projected. Since it is not preferable that an output voltage Vo is at an "H" level when no light is projected, the difference between the voltages V1L and V1H must be greater than a voltage produced by noises when no light is projected. Then, the voltage Vo is monitored while the projection of light is repeated, and the timer 85 is started when the voltage Vo becomes the "H" level (t=c in FIG. 4 ). Thereafter, the reference voltage is set at the voltage V2L output by the reference power supply 76 when light is projected and at the voltage V2H output by the reference power supply 77 when no light is projected. Since it is not preferable that the output voltage Vo is at the "H" level when no light is projected, the difference between the voltages V2L and V2H must be greater than a voltage produced by noises when no light is projected, like the difference between the voltages V1L and V1H. Then, the count value Nm is incremented while the projection of light is repeated, and the light projecting operation and integrating operation are terminated when the voltage Vo becomes the "H" level again. At the same time, the timer 85 is stopped, and the value of the timer 85 at that point in time is stored as the count value N1 in the RAM 81. If the distance of the object is so far that 700 times of projection of light does not bring the voltage Vo to the "H" level again, it is determined that the object is at infinity. Then, the "infinity" flag Fi in the RAM 81 is set to terminate this series of operations.

Next, distance measuring using the second current-to-voltage conversion circuit 30 is performed similarly to distance measuring using the first current-to-voltage conversion circuit 20. First, the switch 4 is placed in the position to turn on the second current-to-voltage conversion circuit 30. Next, the switch 64 is turned on to discharge the charge accumulated in the integration capacitor 63 and, thereafter, the switch 64 is turned off. Then, the count value Nm is cleared to 0. The reference voltage is set at the voltage V1L output by the reference power supply 74 when light is projected and at the voltage V1H output by the reference power supply 75 when no light is projected. Then, the voltage Vo is monitored while the projection of light is repeated, and the timer 85 is started when the voltage Vo becomes the "H" level (c in FIG. 4). Thereafter, the reference voltage is set at the voltage V2L output by the reference power supply 76 when light is projected and to the voltage V2H output by the reference power supply 77 when no light is projected. Then, the count value Nm is incremented while the projection of light is repeated, and the light projecting operation and integrating operation are terminated when the voltage Vo becomes the "H" level again. At the same time, the timer 85 is stopped, and the value of the timer 85 at that point in time is stored as the count value N2 in the RAM 81. If the distance of the object is so far that 300 times of projection of light does not bring the voltage Vo to the "H" level again, it is determined that the object is at infinity. Then, the "infinity" flag Fi in the RAM 81 is set to terminate this series of operations.

Figure 5:
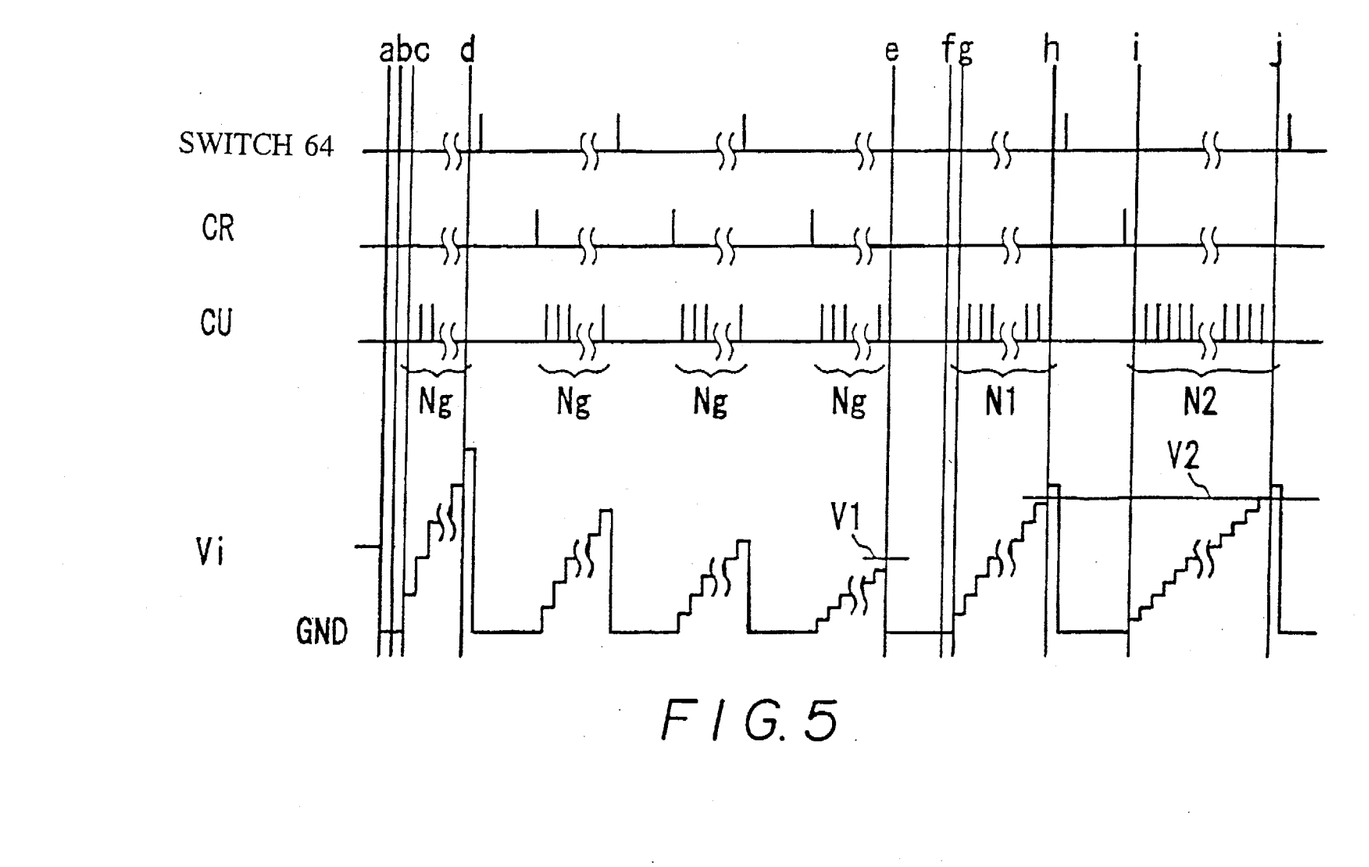
FIG. 5 is an operational diagram illustrating a series of operations from the commencement of gain determination up to the end of range finding in the embodiment of the present invention.

FIG. 5 shows a series of operations from the beginning of gain determination up to the end of distance measuring. In this example, each of the switches 46, 56 and 47 are turned on to optimize the gain. Distance measuring is performed in such a state that the object is not determined as being at infinity, and the count values N1 and N2 are obtained.

The circuit of the present embodiment operates as described above. FIGS. 7 through 10 are a flow chart illustrating the above-described operation. A main routine will be first described with reference to FIG. 7. At the beginning of this distance measuring routine, the CPU 80 turns on the power supply of the distance measuring circuit as a whole (#001), initializes the setting of switches (#002), and initializes variables and flags (#003). Next, the gains of the amplifier circuits 40 and 50 are determined (#004), and the state of the "close" flag Fc is checked (#005). If this flag is set, the CPU 80 sets the value X to 1 (#006) and jumps to subroutine #013. It performs distance measuring using the first current-to-voltage conversion circuit 20 to calculate the count value N1 (#007), and then checks the state of the "infinity" flag Fi (#008) and, if this flag is set, the CPU 80 sets the value X to 0.5 (#009) and jumps to the subroutine #013. Similarly, it performs distance measuring using the second current-to-voltage conversion circuit 30 to calculate the count value N2 (#010), and then checks the state of the "infinity" flag Fi (#011) and, if this flag is set, the CPU 80 sets the value X to 0.5 (#009) and jumps to the subroutine #013 (#008). If the flag Fi is not set, it reads the count values N1 and N2 stored in the RAM 81 through the operations at the subroutines 007 and 010 to calculate the value X (#012). Then, the distance D of the object is obtained (#013) on an assumption that the object is at infinity if the "infinity" flag Fi is set, and is at a close distance if the "close" flag Fc is set. If neither of them is set, the distance is obtained by referring to a predetermined address in the ROM 82 whose offset value is the value X (see FIG. 6). Finally, the photographing lens 84 is driven to a position corresponding to the distance D (#014), and the power supply of the distance measuring circuit is turned off (#015) to exit this routine.

Next, the operation in each subroutine will be described. First, the subroutine for determining the gains of the amplifier circuits 40 and 50 will be described with reference to FIG. 8. At the beginning of the subroutine for determining the gains of the amplifier circuits, the CPU 80 places the switch 4 in the position to turn on the first current-to-voltage conversion circuit 20, and sets the reference voltage at the voltage V0 (#101), turns on the switch 64 instantaneously to discharge the charge accumulated in the integration capacitor 63 (#102), and clears the count value Ns (#103). Further, the count value Ne is cleared to 0 (#104). Then, the CPU 80 stops the transmission of the clock to the voltage raising circuit 90 and causes the light-projecting circuit 10 to operate (#105), and then stands by for the time T1 (#106), and then turns on the switch 7 to start the integrating operation (#107), and stands by for the time T2 (#108) in which period the integration capacitor 63 accumulates charge. Thereafter, the CPU 80 stops the operation of the light-projecting circuit 10 to finish the light projecting operation, and turns off the switch 7 to finish the integrating operation (#109), resumes the transmission of the clock to the voltage raising circuit 90 and stands by for the time T3 (#110) during which period the count value Ne is incremented by 1 (#111). If the count value Ne is less than 10, the CPU 80 jumps to subroutine #105 (#112). If the count value Ne is 10 or more, the CPU 80 compares the integrated voltage Vi with the voltage V0 (#113) and returns to the main routine if the integrated voltage Vi is lower.

Figure 8:
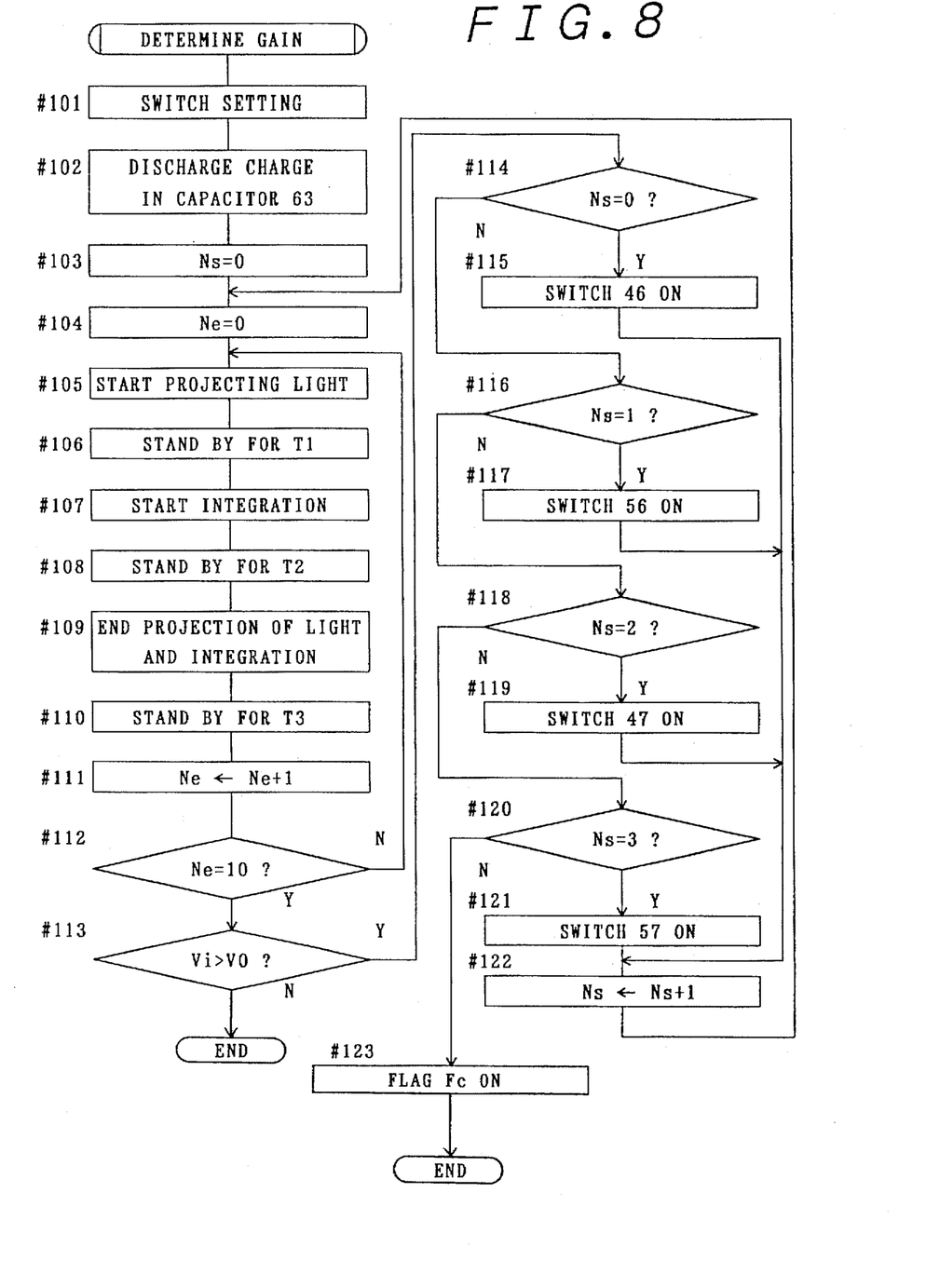
FIG. 8 is a flow chart showing subroutines of the part of the flow chart of FIG. 7 wherein the gain of a downstream amplifier is determined.

When the integrated voltage Vi is higher, if the count value Ns is 0 (#114), the CPU 80 first turns on the switch 46 (#115) and jumps to subroutine #122. If the count value Ns is 1 (#116), the CPU 80 turns on the switch 56 (#117) and jumps to subroutine #122. If the count value Ns is 2 (#118), the CPU 80 turns on the switch 47 (#119) to reduce the gain of the amplifier 41 and jumps to the subroutine #122. If the count value Ns is 3 (#120), the CPU 80 turns on the switch 57 (#121) and jumps to the subroutine #122. If the count value Ns is none of 1, 2 and 3, the CPU 80 sets the "close" flag Fc in the RAM 81 (#123) and exits this subroutine to return to the main routine. At the subroutine #122, the count value Ns is incremented by 1, and the process returns to the subroutine #104.

Figure 9:
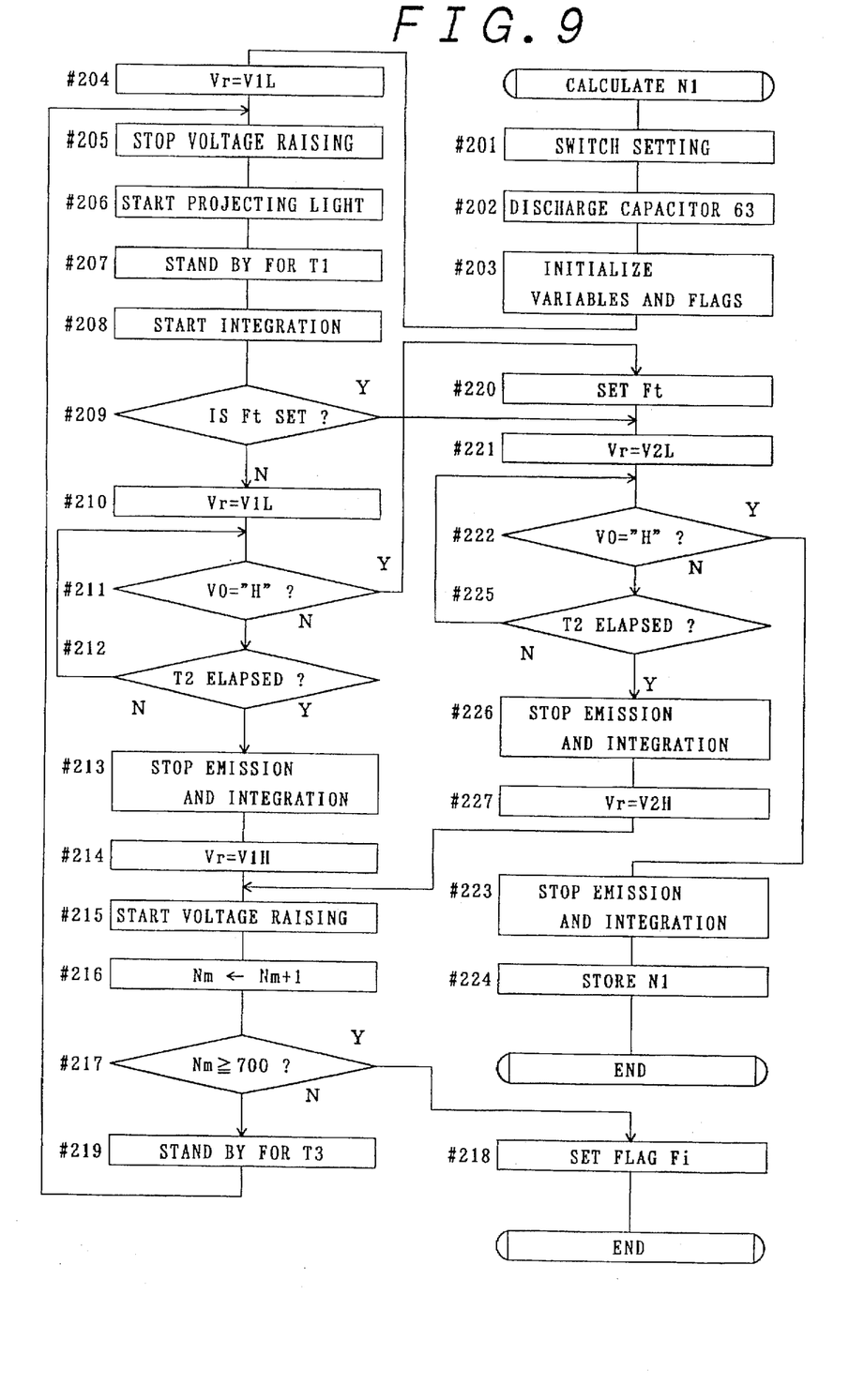
FIG. 9 is a flow chart showing subroutines of the part of the flow chart of FIG. 7 wherein range finding is performed by a first current-to-voltage conversion circuit 20.

Next, the subroutine of calculating the count value N1 will be described with reference to FIG. 9. At the beginning of this subroutine, the CPU 80 places the switch 4 in the position to turn on the first current-to-voltage conversion circuit 20 and connects the switch 72 to the reference power supply 75 (#201). Then, the CPU 80 turns on the switch 64 to discharge the charge accumulated in the integration capacitor 63 (#202). The CPU 80 then resets all flags and clears the count value Nm to 0 (#203), and connects the switch 72 to the reference power supply 74 to set the reference voltage Vr at the voltage V1 L (#204). Next, the CPU 80 interrupts the transmission of the clock to the voltage raising circuit 90 to stop the voltage raising operation (#205), and causes the light-projecting circuit 10 to start projecting light onto the object (#206), and stands by for the time T1 (#207).

When the time T1 has passed and the timer 8 5 times up, the CPU 80 turns on the switch 7 to start integrating operation (#208). At this point, it detects whether a "timer operation" flag Ft has been set (#209) and, if the "timer operation" flag Ft is set, jumps to subroutine #221. If not, it connects the switch 72 to the reference power supply 74 to set the reference voltage Vr at the voltage V1 L (#210).

Meanwhile, the integration capacitor 63 accumulates charge. Then, the CPU 80 detects the output voltage Vo and, if the output voltage Vo is at the "H" level, jumps to subroutine #220 (#211). If the output voltage Vo is at the "L" level, it repeats the detection operation at the subroutine #211 until the time T2 elapses since the subroutine #208 (#212). When the time T2 has elapsed since the subroutine #208, the CPU 80 stops the operation of the light-projecting circuit 10 to finish the light projecting operation, and then turns off the switch 7 to finish the integrating operation (#213), and connects the switch 72 to the reference power supply 75 to set the reference voltage Vr at the voltage V1 H (#214). It resumes the transmission of the clock to the voltage raising circuit 90 to start the voltage raising operation (#215), and increments the count value Nm by 1 (#216), and, if the resultant count value Nm has reached 700 (#217), the CPU 80 sets the "infinity" flag Fi to terminate this series of operation (#218). If the count value Nm is less than 700, the CPU 80 stands by for the time T3 (#219), and then jumps to subroutine #205.

Figure 4:
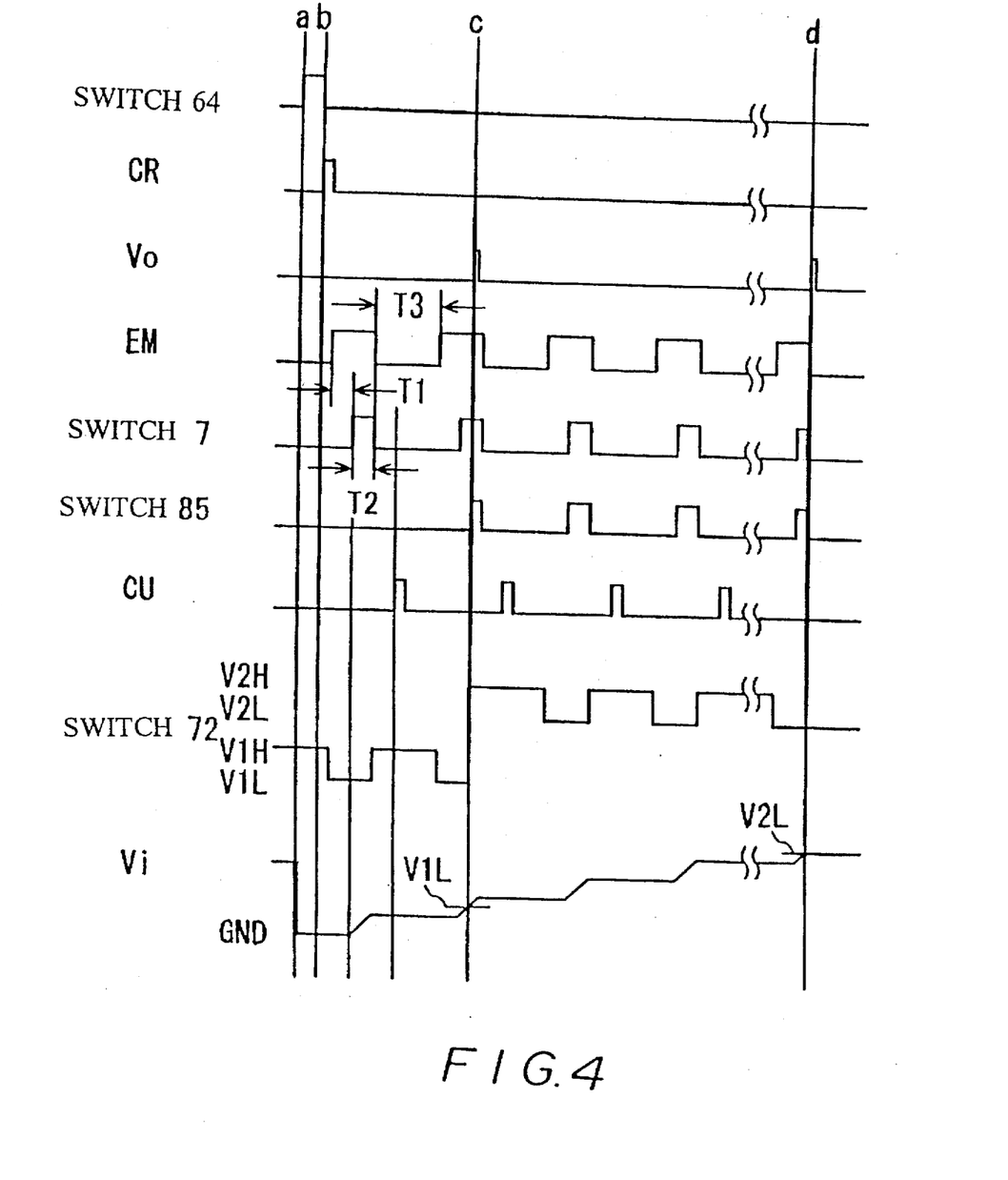
FIG. 4 is an operational diagram illustrating a method for calculating count values N1 and N2 of the embodiment of the present invention.

If the output voltage Vo is at the "H" level at the subroutine #211, as indicated by d in FIG. 4, the voltage of the integration capacitor 63 has reached the voltage V1L. Then, the "timer operation" flag Ft is set (#220), and the reference voltage Vr is connected to the voltage V2 L (#221).

Meanwhile, the integration capacitor 63 accumulates charge. Then, the CPU 80 detects the output voltage Vo, and stops the emission of light and the integrating operation if the output voltage Vo is at the "H" level (#223), and exits this routine after storing the value remaining in the timer 85 in the RAM 81 for the count value N1 in the RAM 81 (#224). If the output voltage Vo is at the "L" level, it repeats the detection operation at the subroutine #222 until the time T2 elapses since the subroutine #208 (#225). When the time T2 has elapsed since the subroutine #208, the CPU 80 stops the operation of the light-projecting circuit 10 to finish the light projecting operation, turns off the switch 7 to finish the integrating operation (#226), connects the switch 72 to the reference power supply 77 to set the reference voltage Vr at the voltage V2H (#227), and returns to the subroutine #215.

Figure 10:
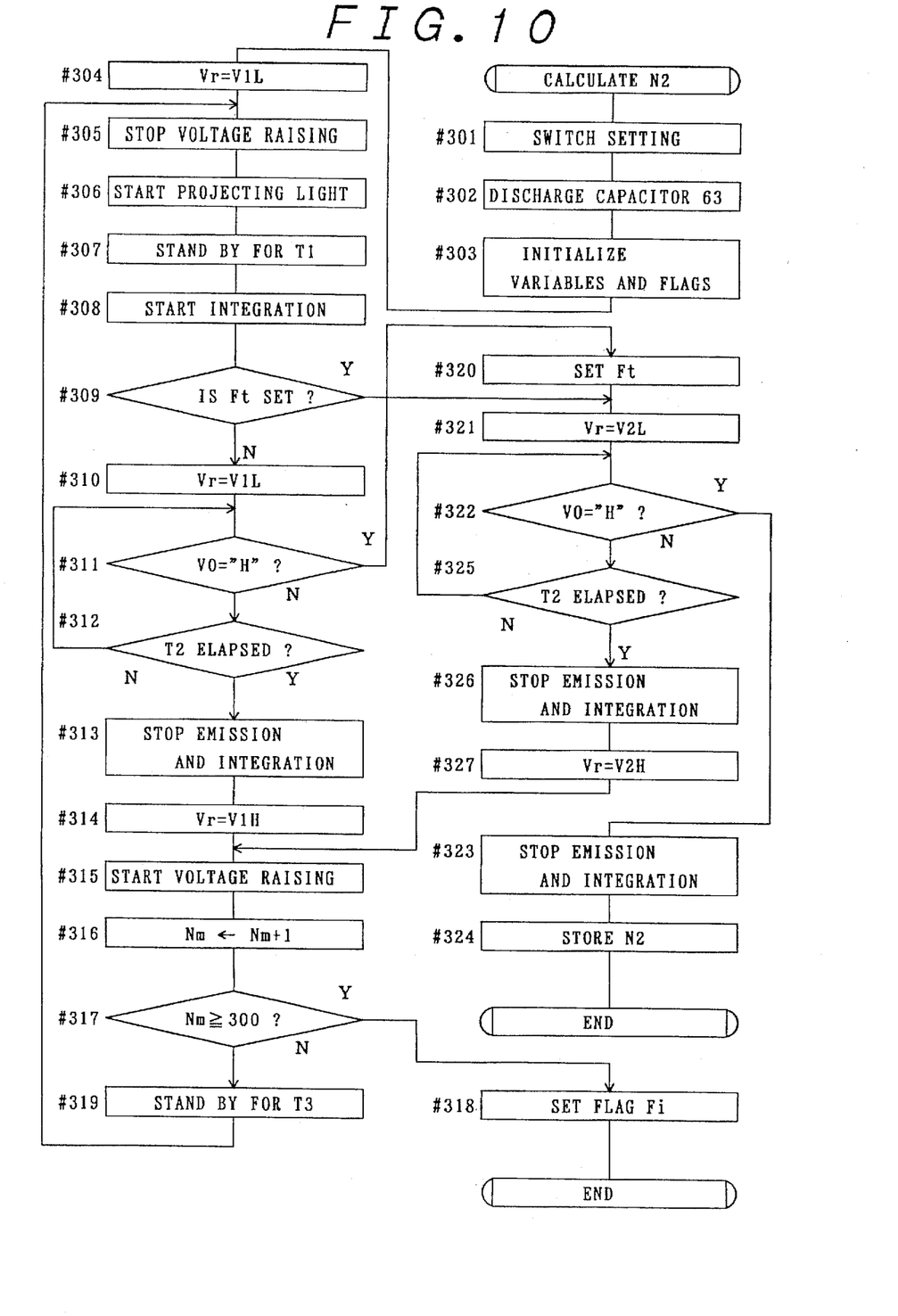
FIG. 10 is a flow chart showing subroutines of the part of the flow chart of FIG. 7 wherein range finding is performed by a second current-to-voltage conversion circuit 30.

Next, the subroutine of calculating the count value N2 will be described with reference to FIG. 10. At the beginning of this subroutine, the CPU 80 places the switch 4 in the position to contact with the second current-to-voltage conversion circuit 30 and connects the switch 72 to the reference power supply 75 (#301). Then, the CPU 80 turns on the switch 64 to discharge the charge accumulated in the integration capacitor 63 (#302). The CPU 80 then resets all flags and clears the count value Nm to 0 (#303), and connects the switch 72 to the reference power supply 74 to set the reference voltage Vr at the voltage V1L (#304). Next, the CPU 80 interrupts the transmission of the clock to the voltage raising circuit 90 to stop the voltage raising operation (#305), causes the light-projecting circuit 10 to start projecting light onto the object (#306), and stands by for the time T1 (#307).

When the time T1 has passed and the timer 85 times up, the CPU 80 turns on the switch to start integrating operation (#308). At this point, it detects whether the "timer operation" flag Ft has been set (#309) and, if the "timer operation" flag Ft is set, jumps to subroutine #321. If not, it connects the switch 72 to the reference power supply 74 to set the reference voltage Vr at the voltage V1L (#310).

Meanwhile, the integration capacitor 63 accumulates charge. Then, the CPU 80 detects the output voltage Vo and, if the output voltage Vo is at the "H" level, jumps to subroutine #320 (#311). If the output voltage Vo is at the "L" level, it repeats the detection operation at the subroutine #311 until the time T2 elapses since the subroutine #308 (#312). When the time T2 has elapsed since the subroutine #308, the CPU 80 stops the operation of the light-projecting circuit 10 to finish the light projecting operation, and then turns off the switch 7 to finish the integrating operation (#313), and connects the switch 72 to the reference power supply 75 to set the reference voltage Vr at the voltage V1H (#314). It resumes the transmission of the clock to the voltage raising circuit 90 to start the voltage raising operation (#315), increments the count value Nm by 1 (#316), and, if the resultant count value Nm has reached 300 (#317), sets the "infinity" flag Fi to terminate this series of operation (#318). If the count value Nm is less than 300, the CPU 80 stands by for the time T3 (#319), and then jumps to subroutine #305.

If the output voltage Vo is at the "H" level at the subroutine #311, as indicated by d in FIG. 4, the voltage across of the terminals of the integration capacitor 63 has reached the voltage V1L. Then, the "timer operation" flag Ft is set (#320), and the reference voltage Vr is set at the voltage V2L (#321).

Meanwhile, the integration capacitor 63 accumulates charge. Then, the CPU 80 detects the output voltage Vo, stops the emission of light and integration if the output voltage Vo is at the "H" level (#323), and exits this routine after storing the value remaining in the timer 85 in the RAM 81 as the count value N2 in the RAM 81 (#324). If the output voltage Vo is at the "L" level, it repeats the detection operation at the subroutine #322 until the time T2 elapses since the subroutine #308 (#325). When the time T2 has elapsed since the subroutine #308, the CPU 80 stops the operation of the light-projecting circuit 10 to finish the light projecting operation, and turns off the switch 7 to finish the integrating operation (#326), and connects the switch 72 to the reference power supply 77 to set the reference voltage Vr at the voltage V2 H (#327), and returns to the subroutine #315.

The value X is calculated from the count values N1 and N2 thus obtained to find the distance of the object. The integrated voltage is always compared with a predetermined reference voltage by a comparator, and this reference voltage is set higher by a predetermined value for periods other than the light-emitting and integration periods. This prevents the output of the comparator from being inverted by the influence of circuit noises or the like during periods other than the period of the integrating operation.

Although the reference voltage Vr of the level judgement circuit 70 is provided by a reference power supply in the above-described embodiment, it may be established by turning on and off a voltage dividing resistor or a transistor and may be freely modified within the scope of the spirit of the present invention.

In the configuration according to the present invention, the reference voltage for judging the level of the output signal of the integration circuit is set higher by a predetermined value for periods other than the light-emitting and integration periods. This makes a distance measuring operation less susceptible to the influence of circuit noises and the like, thereby allowing distance measuring with higher accuracy.

What is claimed is:

1. A distance measuring device comprising: light-projecting means for performing a light projection operation by projecting a series of light pulses toward an object; light-receiving means for receiving the light projected by said light-projecting means and reflected by the object; a current-to-voltage conversion circuit for converting a current output by said light-receiving means into a voltage; an amplifier circuit for amplifying an output signal of said current-to-voltage conversion circuit; an integration circuit for integrating an output signal of said amplifier circuit; a level judgement circuit for judging the level of an output signal of said integration circuit by comparing it with a reference voltage and for generating an output signal to stop the integration when the level of the output signal of the integration circuit reaches the reference voltage; timer means for counting a time duration during which integration is performed; control means for switching said reference voltage depending on whether said light-projecting means is projecting light or not during the light projection operation; and a calculating circuit for calculating the distance of said object based on the output of said level judgement circuit.

2. A distance measuring device according to claim 1; wherein the light-receiving means comprises a light receiving element for receiving the light reflected by the object and converting the received light into first and second current outputs.

3. A distance measuring device according to claim 2; wherein the current-to-voltage conversion circuit comprises first current-to-voltage converting means for converting the first current output into a first voltage and second current-to-voltage converting means for converting the second current output into a second voltage.

4. A distance measuring device according to claim 3; wherein each of the first and second current-to-voltage converting means comprises an amplifier and a feedback resistor.

5. A distance measuring device according to claim 1; wherein the amplifier circuit comprises series-connected first and second amplifying circuits.

6. A distance measuring device according to claim 5; wherein each of the first and second amplifying circuits comprises an amplifier and a feedback loop having a plurality of feedback resistors and a plurality of switches for selectively connecting respective ones of the feedback resistors to the feedback loop to provide an adjustable gain.

7. A distance measuring device according to claim 1; wherein the integration circuit comprises an amplifier, an input resistor, an integrating capacitor and a voltage follower.

8. A distance measuring device according to claim 7; wherein the integration circuit further comprises a switch connected across the integrating capacitor for selectively discharging the integrating capacitor.

9. A distance measuring apparatus comprising: light projecting means for performing a light projection operation by projecting a series of light pulses toward an object; light receiving means for receiving light projected by the light projecting means and reflected by the object and converting the received light into first and second output signals in accordance with the intensity and direction of the received light; selecting means for selecting one of the first and second output signals; signal processing means connected to the selecting means for processing the first and second output signals and generating output signals containing distance measurement information; reference voltage generating means for generating a reference voltage having a variable level; a level judging circuit for judging the level of an output signal of the signal processing means by comparing it with the reference voltage and for generating an output signal to stop the signal processing when the level of the output signal of the signal processing means reaches the reference voltage; timer means for counting a time period of a signal processing operation; control means for controlling the light projecting means to project a light, controlling the selecting means to select the first output signal such that the first output signal is processed by the signal processing means, controlling the selecting means to select the second output signal such that the second output signal is processed by the signal processing means, and controlling the reference voltage generating means to vary the level of the reference voltage depending upon whether the light projecting means is projecting a light during the light projection operation; and calculating means for calculating a distance to the object in accordance with an output signal of the level judging circuit.

10. A distance measuring apparatus according to claim 9; wherein the light receiving means comprises a light receiving element for receiving the light reflected by the object and converting the received light into first and second current outputs, first current-to-voltage converting means for converting the first current output into a voltage which comprises the first output signal, and second current-to-voltage converting means for converting the second current output into a voltage which comprises the second output signal.

11. A distance measuring apparatus according to claim 10; wherein each of the first and second current-to-voltage converting means comprises an amplifier and a feedback resistor.

12. A distance measuring apparatus according to claim 9; wherein the signal processing means comprises an amplifying circuit connected to the selecting means for amplifying the first and second output signals, and integrating means for integrating an output of the amplifying circuit.

13. A distance measuring apparatus according to claim 9; wherein the signal processing means comprises first and second amplifying circuits connected to the selecting means for amplifying the one of the first and second output signals which is selected by the selecting means, and integrating means for integrating an output of the second amplifying means.

14. A distance measuring apparatus according to claim 13; wherein each of the first and second amplifying circuits comprises an amplifier and a feedback loop having a plurality of feedback resistors and a plurality of switches for selectively connecting respective ones of the feedback resistors to the feedback loop to provide an adjustable gain.

15. A distance measuring apparatus according to claim 13; wherein the integrating means comprises an amplifier, an input resistor, an integrating capacitor and a voltage follower.

16. A distance measuring apparatus for a camera, comprising: light projecting means for performing a light projection operation by projecting a series of light pulses toward an object; light receiving means for receiving light projected by the light projecting means and reflected by the object and converting the received light into first and second current outputs in accordance with the intensity and direction of the received light; first current-to-voltage converting means for converting the first current output into a first voltage; second current-to-voltage converting means for converting the second current output into a second voltage; selecting means for selecting an output signal from one of the first and second current-to-voltage converting means; first amplifying means connected to the selecting means for amplifying the output signal selected by the first selecting means; second amplifying means connected to the first amplifying means for amplifying an output signal of the first amplifying means; integrating means for integrating an output of the second amplifying means; reference voltage generating means for generating a reference voltage having a variable level; comparing means for comparing an output of the integrating means with the reference voltage and for generating an output signal to stop the integration operation when the level of the output signal of the integrating means reaches the reference voltage; timer means for counting a time period during which integration is performed; control means for controlling the light projecting means to project a light, controlling the selecting means to sequentially select the first and second voltages such that the first and second amplifying means and the integrating means sequentially process the first and second voltages, respectively, and for controlling the reference voltage generating means to vary the level of the reference voltage depending upon whether the light projecting means is projecting a light during the light projection operation; and calculating means for calculating a distance to the object in accordance with an output signal of the comparing means.

17. A distance measuring apparatus according to claim 16; wherein each of the first and second current-to-voltage converting means comprises an amplifier and a feedback resistor.

18. A distance measuring apparatus according to claim 16; wherein each of the first and second amplifying means comprises an amplifier and a feedback loop having a plurality of feedback resistors and a plurality of switches for selectively connecting respective ones of the feedback resistors to the feedback loop so as to provide an adjustable gain.

19. A distance measuring apparatus according to claim 16; wherein the integrating means comprises an amplifier, an input resistor, an integrating capacitor and a voltage follower.

20. A distance measuring device according to claim 1; wherein the timer means comprises means for counting the number of light pulses projected by the light projecting means during the integration operation; and the calculating circuit includes means for calculating the distance of the object in accordance with the counted number of pulses.

21. A distance measuring device according to claim 1; wherein the control means includes means for reducing the reference voltage during periods of time when no light pulses are being generated during the light projection operation.

22. A distance measuring apparatus according to claim 9; wherein the timer means comprises means for counting the number of light pulses projected by the light projecting means during the signal processing operation; and the calculating circuit includes means for calculating the distance of the object in accordance with the counted number of pulses.

23. A distance measuring device according to claim 9; wherein the control means includes means for reducing the reference voltage during periods of time when no light pulses are being generated during the light projection operation.

24. A distance measuring apparatus according to claim 16; wherein the timer means comprises means for counting the number of light pulses projected by the light projecting means during the integration operation; and the calculating circuit includes means for calculating the distance of the object in accordance with the counted number of pulses.

25. A distance measuring device according to claim 16; wherein the control means includes means for reducing the reference voltage during periods of time when no light pulses are being generated during the light projection operation.

* * * * *